United States Patent
Sawada

(10) Patent No.: US 11,474,246 B2
(45) Date of Patent: Oct. 18, 2022

(54) VEHICLE TRACKING DEVICE

(71) Applicant: Robert Bosch GmbH, Stuttgart (DE)

(72) Inventor: Makoto Sawada, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 17/082,271

(22) Filed: Oct. 28, 2020

(65) Prior Publication Data
US 2021/0124052 A1    Apr. 29, 2021

(30) Foreign Application Priority Data

Oct. 28, 2019    (JP) .............................. JP2019-195512

(51) Int. Cl.
| | |
|---|---|
| *G01S 17/66* | (2006.01) |
| *G01S 13/58* | (2006.01) |
| *G01S 17/58* | (2006.01) |
| *B60W 30/095* | (2012.01) |
| *G01S 17/89* | (2020.01) |
| *G01S 13/931* | (2020.01) |
| *G01S 17/931* | (2020.01) |

(52) U.S. Cl.
CPC .............. *G01S 17/58* (2013.01); *G01S 13/58* (2013.01); *B60W 30/0956* (2013.01); *B60W 2554/4044* (2020.02); *G01S 13/931* (2013.01); *G01S 17/89* (2013.01); *G01S 17/931* (2020.01)

(58) Field of Classification Search
CPC .......... G01S 17/66; G01S 17/93; G01S 17/87; G01S 17/58; G01S 13/66; G01S 13/86; G01S 13/58; G08G 1/16
See application file for complete search history.

(56) References Cited

U.S. PATENT DOCUMENTS

| | | | | |
|---|---|---|---|---|
| 6,650,983 B1 * | 11/2003 | Rao | ..................... | B60G 17/0195 342/72 |
| 2009/0292468 A1 * | 11/2009 | Wu | ........................ | G08G 1/165 342/146 |
| 2015/0307095 A1 * | 10/2015 | Aso | ....................... | B60W 30/10 701/1 |

FOREIGN PATENT DOCUMENTS

JP        2017129446 A        7/2017

* cited by examiner

*Primary Examiner* — Tan Q Nguyen
(74) *Attorney, Agent, or Firm* — Michael Best & Friedrich LLP

(57) ABSTRACT

Provided is a vehicle tracking device capable of appropriately tracking a vehicle. The vehicle tracking device is a vehicle tracking device that tracks a target vehicle that travels at the periphery of a host vehicle. The vehicle tracking device includes: an estimation unit that estimates a rectangular frame approximating an external shape of the target vehicle on the basis of past data; and a specifying unit that specifies an advancing direction of the target vehicle on the basis of layout of contour data composed of a plurality of pieces of detection point data, which is detected by a sensor that is mounted to the host vehicle and detects a relative position of a detection target with respect to the host vehicle as the detection point data, and indicates a contour of the target vehicle, with respect to a reference side that is a side on the host vehicle side among sides of the rectangular frame along a vehicle width direction of the rectangular frame.

9 Claims, 12 Drawing Sheets

FIG. 2
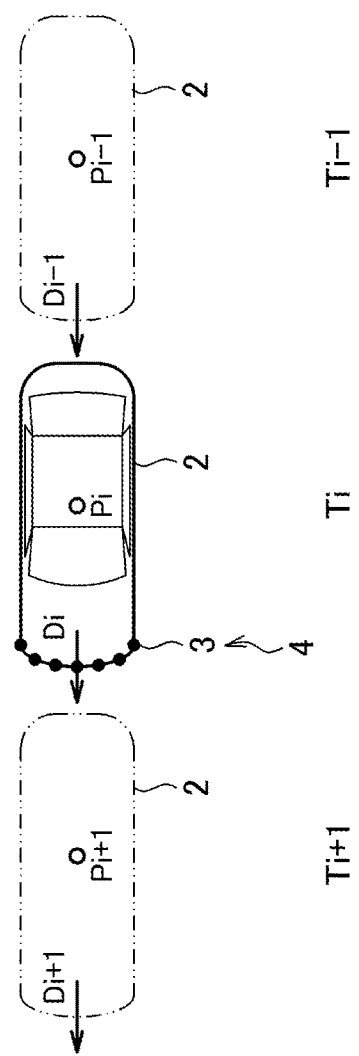
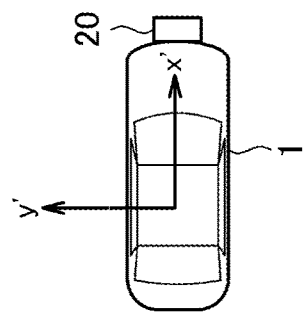

FIG. 6
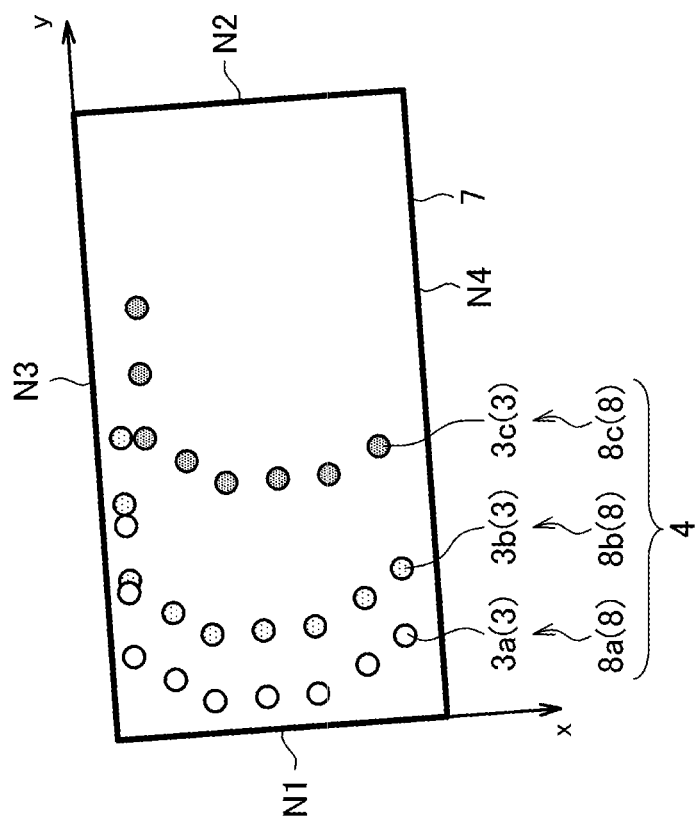
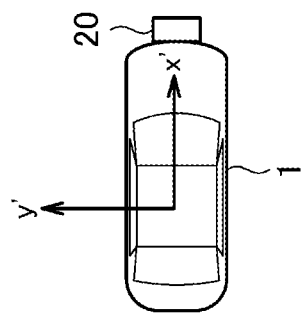

FIG. 10
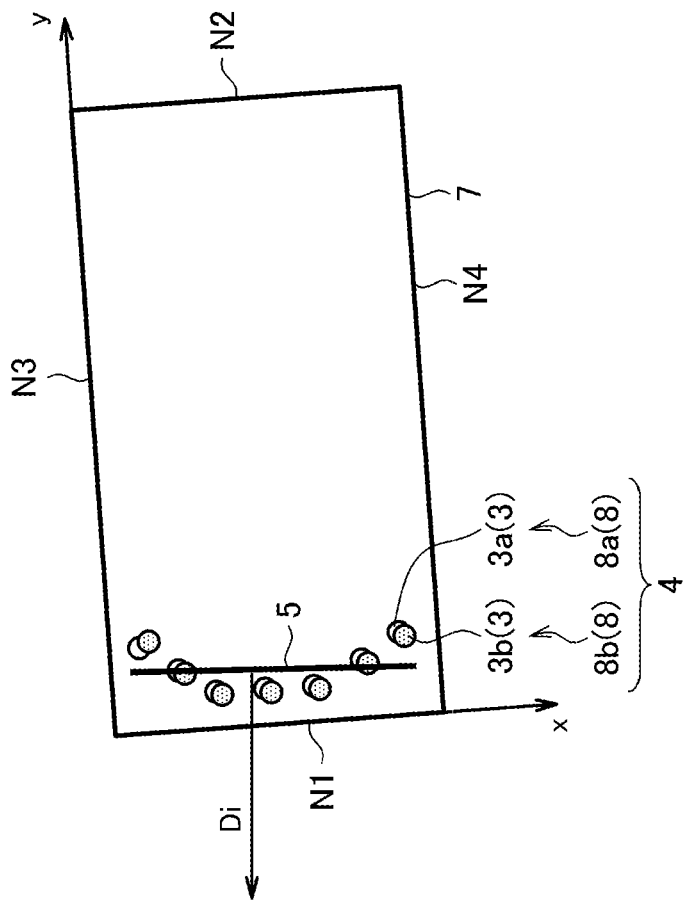
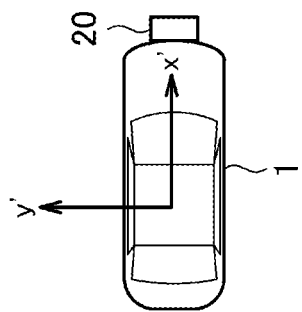

ВЕHICLE TRACKING DEVICE

BACKGROUND OF THE INVENTION

The present invention relates to a vehicle tracking device.
In the related art, a technology of tracking a target vehicle that travels at the periphery of a host vehicle is suggested (for example, refer to JP-A-2017-129446). Information (for example, a position, an advancing direction, and a velocity of the target vehicle) obtained through vehicle tracking is used in control related to collision prevention, or the like.

SUMMARY OF THE INVENTION

However, in the vehicle tracking, the advancing direction of the target vehicle is specified at each detection time, and the target vehicle is recognized by using the specified advancing direction. For example, a current position of the target vehicle is estimated on the basis of a past advancing direction of the target vehicle which is specified at a past detection time, and a vehicle detected in the vicinity of the estimated position is recognized as the target vehicle.

In the specifying of the advancing direction of the target vehicle, a sensor that is mounted to the host vehicle and detects a relative position of the detection target with respect to the host vehicle as detection point data may be used in some cases. Specifically, the advancing direction of the target vehicle is specified on the basis of contour data composed of a plurality of pieces of detection point data indicating a target vehicle contour detected by the sensor. Here, specifying accuracy for the advancing direction of the target vehicle may decrease, and the target vehicle may not be appropriately tracked in some cases. For example, specifying of the advancing direction by using the contour data is performed basically on the assumption that the plurality of pieces of detection point data in the contour data are data on a front surface or a rear surface of the target vehicle. However, data on a lateral surface of the target vehicle may be included in the contour data, and in this case, there is a concern that the advancing direction that is specified may be greatly deviate from an actual advancing direction, and thus it is difficult to appropriately track the target vehicle.

Here, the invention has been made in consideration of the problem, and an object thereof is to provide a vehicle tracking device capable of appropriately tracking a vehicle.

To solve the problem, according to an aspect of the invention, there is provided a vehicle tracking device that tracks a target vehicle that travels at the periphery of a host vehicle. The vehicle tracking device includes: an estimation unit that estimates a rectangular frame approximating an external shape of the target vehicle on the basis of past data; and a specifying unit that specifies an advancing direction of the target vehicle on the basis of layout of contour data composed of a plurality of pieces of detection point data, which is detected by a sensor that is mounted to the host vehicle and detects a relative position of a detection target with respect to the host vehicle as the detection point data, and indicates a contour of the target vehicle, with respect to a reference side that is a side on the host vehicle side among sides of the rectangular frame along a vehicle width direction of the rectangular frame.

According to the invention, it is possible to appropriately track a vehicle.

BRIEF DESCRIPTION OF THE DRAWINGS

FIG. 2 is a schematic view for describing an outline of a process of tracking an oncoming vehicle by the vehicle tracking device according to the embodiment of the invention;

FIG. 6 is a schematic view illustrating an example of a rectangular frame that is estimated by an estimation unit according to the embodiment of the invention;

FIG. 10 is a schematic view illustrating an aspect in which the advancing direction of the oncoming vehicle is specified by a specifying unit according to the embodiment of the invention;

DETAILED DESCRIPTION

Hereinafter, a preferred embodiment of the invention will be described in detail with reference to the accompanying drawings. Dimensions, materials, and specific numerical values, and the like which are noted in the embodiment are illustrative only for easy understanding of the invention, and are not intended to limit the invention unless otherwise stated. Note that, in this specification and the drawings, the same reference will be given to an element having substantially the same function and configuration and redundant description thereof will be omitted, and elements which are not directly related to the invention will be omitted.

Note that, hereinafter, description will be given of an example in which a target vehicle that becomes a tracking target travelling at the periphery of a host vehicle is an oncoming vehicle (that is, a vehicle that travels in a direction opposite to an advancing direction of the host vehicle on a forward side of the host vehicle), but the target vehicle that becomes the tracking target may be a preceding vehicle (that is, a vehicle that travels on a forward side of the host vehicle in the same direction as the advancing direction of the host vehicle). In this case, the oncoming vehicle in a process relating to tracking for the oncoming vehicle to be described below may be substituted with the preceding vehicle.

<Configuration of Host Vehicle>

Description will be given of a configuration of a host vehicle 1 on which a vehicle tracking device 10 according to the embodiment of the invention is mounted with reference to FIG. 1 to FIG. 4.

Figure 1:
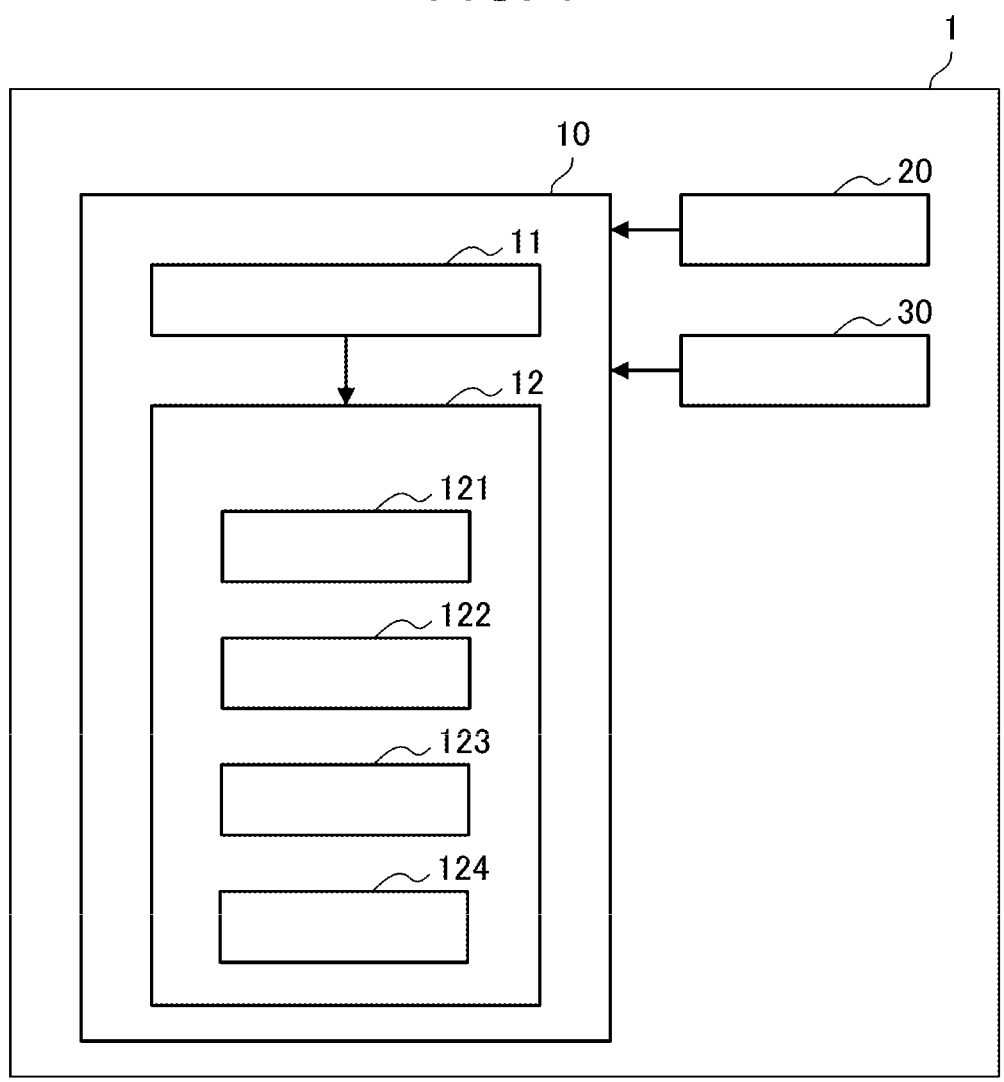
FIG. 1 is a block diagram illustrating a schematic configuration of a host vehicle on which a vehicle tracking device according to the embodiment of the invention is mounted.

FIG. 1 is a block diagram illustrating a schematic configuration of the host vehicle 1. The host vehicle 1 includes the vehicle tracking device 10, a laser imaging detection and ranging (LIDAR) 20, and a radar 30. In the host vehicle 1, tracking for the oncoming vehicle as a target vehicle that travels at the periphery of the host vehicle 1 is performed by the vehicle tracking device 10 by using detection results of the LIDAR 20 and the radar 30 which are mounted to the host vehicle 1. In the tracking for the oncoming vehicle, a position, an advancing direction, and a velocity of the oncoming vehicle are specified at each detection time. Information specified in the tracking for the oncoming vehicle is used, for example, in control relating to collision prevention of the host vehicle 1 (for example, control of alarming approaching of a forward vehicle, emergent braking control, adaptive cruise control, or lane changing control), and the like.

The LIDAR 20 corresponds to an example of a sensor according to the invention which detects a relative position of a detection target with respect to the host vehicle 1 as detection point data. The LIDAR 20 irradiates the detection target with light and receives light reflected from the detection target, thereby detecting the relative position of the detection target as the detection point data. Specifically, the LIDAR 20 detects contour data composed of a plurality of pieces of detection point data indicating the contour of the oncoming vehicle. The contour data can be used in a process of tracking the oncoming vehicle by the vehicle tracking device 10. For example, the LIDAR 20 is mounted to a front end of the host vehicle 1. Note that, the sensor according to the invention is not limited to the LIDAR 20, and may be, for example, a radar sensor (for example, the radar 30), an infrared sensor, an ultrasonic sensor, or the like. That is, a method for detecting the detection point data by the sensor according to the invention is not particularly limited.

The radar 30 detects a relative velocity of a detection target with respect to the host vehicle 1. The radar 30 irradiates the detection target with radio waves, and receives radio waves reflected from the detection target, thereby detecting the relative velocity of the detection target. For example, the radar 30 is mounted to the front end of the host vehicle 1. Note that, as the sensor that detects the relative velocity of the detection target, a sensor using a different detection method other than the radar 30 may be used.

The vehicle tracking device 10 includes a central processing unit (CPU) that is an operation processing device, a read only memory (ROM) that is a storage element that stores programs, operation parameters, and the like which are used by the CPU, and a random access memory (RAM) that is a storage element that temporarily stores parameters and the like which appropriately vary in execution of the CPU, and the like.

For example, the vehicle tracking device 10 includes an acquisition unit 11 and a tracking unit 12.

The acquisition unit 11 acquires information that is used in a process by the tracking unit 12, and outputs the information to the tracking unit 12. For example, the acquisition unit 11 acquires detection results by the LIDAR 20 and the radar 30. Detection by the LIDAR 20 and the radar 30 is performed each detection time with time intervals set in advance. Information detected by the LIDAR 20 and the radar 30 is associated with the detection time.

The tracking unit 12 performs a tracking process of tracking an oncoming vehicle as the target vehicle that travels at the periphery of the host vehicle 1. The tracking unit 12 includes an estimation unit 121, an adjustment unit 122, a specifying unit 123, and a recognition unit 124.

The estimation unit 121 and the adjustment unit 122 perform a process for optimizing specifying of advancing direction of the oncoming vehicle which is performed by the specifying unit 123 to be described later. Specifically, the estimation unit 121 estimates a rectangular frame that approximates an external shape of the oncoming vehicle on the basis of past data. The adjustment unit 122 adjusts the oncoming vehicle contour data detected by the LIDAR 20 by using the rectangular frame.

The specifying unit 123 specifies various pieces of information on the oncoming vehicle. Specifically, the specifying unit 123 specifies a position, an advancing direction, and a velocity of the oncoming vehicle. Specifying of the position, the advancing direction, and the velocity of the oncoming vehicle is performed at each detection time of the LIDAR 20 and the radar 30. The specifying of the position and the advancing direction of the oncoming vehicle is performed on the basis of the oncoming vehicle contour data detected by the LIDAR 20. Particularly, in specifying of the advancing direction of the oncoming vehicle, the rectangular frame estimated by the estimation unit 121 is used. Specifying of the velocity of the oncoming vehicle is performed on the basis of detection results of the radar 30.

Note that, the position of the oncoming vehicle which is specified by the specifying unit 123 may be a relative position with respect to the host vehicle 1, or may be an absolute position. In addition, the velocity of the oncoming vehicle which is specified by the specifying unit 123 may be a relative velocity with respect to the host vehicle 1, or an absolute velocity.

The recognition unit 124 recognizes that a vehicle (that is, vehicle corresponding to detection results by the LIDAR 20 and the radar 30) detected by the LIDAR 20 and the radar 30 is which vehicle. Specifically, the recognition unit 124 estimates a position of an oncoming vehicle at the subsequent detection time on the basis of information relating to the oncoming vehicle which is specified by the specifying unit 123, and recognizes a vehicle detected in the vicinity of the estimation position (that is, the estimated position) at the subsequent detection time as the oncoming vehicle.

Here, description will be given of an outline of the process of tracking the oncoming vehicle 2 by the vehicle tracking device 10 with reference to FIG. 2. FIG. 2 is a schematic view for describing an outline of the process of tracking an oncoming vehicle 2 by the vehicle tracking device 10. In FIG. 2, the host vehicle 1, and the oncoming vehicle 2 as a target vehicle that travels at the periphery of the host vehicle 1 are illustrated. An x'-y' coordinate system is a coordinate system of the LIDAR 20. An x'-axis matches an advancing direction of the host vehicle 1, and a y'-axis is orthogonal to the x'-axis on a horizontal plane.

As illustrated in FIG. 2, in the process of tracking the oncoming vehicle 2, contour data 4 composed of a plurality of pieces of detection point data 3 indicating the contour of the oncoming vehicle 2 is detected by the LIDAR 20. A plurality of dots on a front surface of the oncoming vehicle 2 in FIG. 2 correspond to the plurality of pieces of detection point data 3. The plurality of pieces of detection point data 3 in the contour data 4 is basically the data on the front surface of the oncoming vehicle 2 (that is, data indicating a relative position of the points on the front surface of the oncoming vehicle 2 with respect to the host vehicle 1). A position and an advancing direction of the oncoming vehicle 2 are specified by using the contour data 4.

The specifying unit 123 specifies an advancing direction Di on the basis of a distribution of the plurality of pieces of detection point data 3 in the contour data 4 at detection time Ti. In addition, a central position of the oncoming vehicle 2 assumed in a case where the plurality of pieces of detection point data 3 in the contour data 4 are assumed as the data on the front surface of the oncoming vehicle 2 is specified as a position Pi of the oncoming vehicle 2. That is, the position Pi of the oncoming vehicle 2 is specified on the basis of a distribution of the plurality of pieces of detection point data 3 in the contour data 4. An advancing direction Di−1 and a position Pi−1 of the oncoming vehicle 2 which are similarly specified at detection time Ti−1 previous to the detection time Ti are illustrated in FIG. 2. In addition, an advancing direction Di+1 and a position Pi+1 of the oncoming vehicle 2 which are similarly specified at a detection time Ti+1 subsequent to the detection time Ti are illustrated in FIG. 2.

The recognition unit 124 estimates an estimation position of the oncoming vehicle 2 at the detection time Ti on the basis of the advancing direction Di−1 and the position Pi−1 of the oncoming vehicle 2 which are specified at the previous detection time Ti−1. Specifically, the recognition unit 124 estimates a position where the oncoming vehicle 2 reaches in the case of advancing from the position Pi−1 in the advancing direction Di−1 at a velocity at the detection time Ti−1 between the detection time Ti−1 and the detection time Ti as a position of the oncoming vehicle 2 at the detection time Ti. In addition, the recognition unit 124 compares the estimation position of the oncoming vehicle 2 at the detection time Ti and the position Pi, and determines whether or not a vehicle detected at the position Pi at the detection time Ti is the oncoming vehicle 2.

For example, in a case where the position Pi is close to the estimation position of the oncoming vehicle 2 at the detection time Ti to a certain extent, the recognition unit 124 recognizes the vehicle detected at the position Pi at the detection time Ti as the oncoming vehicle 2. On the other hand, in a case where the position Pi is greatly spaced apart from the estimation position of the oncoming vehicle 2 at the detection time Ti, the recognition unit 124 recognizes the vehicle detected at the position Pi at the detection time Ti as a vehicle different from the oncoming vehicle 2. Similarly, the recognition unit 124 estimates an estimation position of the oncoming vehicle 2 at the detection time Ti+1 on the basis of the advancing direction Di and the position Pi of the oncoming vehicle 2 which are specified at the detection time Ti, and compares the estimation position of the oncoming vehicle 2 at the detection time Ti+1 and the position Pi+1 with each other to determine whether or not a vehicle detected at the position Pi+1 at the detection time Ti+1 is the oncoming vehicle 2.

Since the oncoming vehicle 2 is tracked as described above, various pieces of information on the oncoming vehicle 2 at each detection time can be specified. Here, in the related art, specifying accuracy for an advancing direction of the oncoming vehicle 2 may decrease, and it may be difficult to appropriately track the oncoming vehicle 2. For example, data on a lateral surface of the oncoming vehicle 2 may be included in the contour data 4, and this case, in the related art, there is a concern that a specified advancing direction deviates from an actual advancing direction, and thus it is difficult to appropriately track the oncoming vehicle 2. Specifically, in specifying of the advancing direction of the oncoming vehicle 2, each piece of detection point data 3 detected by the LIDAR 20, and a surface (two surfaces to the maximum) facing the LIDAR 20 among outer surfaces of the oncoming vehicle 2 are associated with each other, and a plurality of pieces of the detection point data 3 associated with the front surface of the oncoming vehicle 2 correspond to the contour data 4. However, association between the detection point data 3 and the surface may not be correctly performed, and as a result of the association, data on a lateral surface adjacent to the front surface may be included in the contour data 4.

Figure 3:
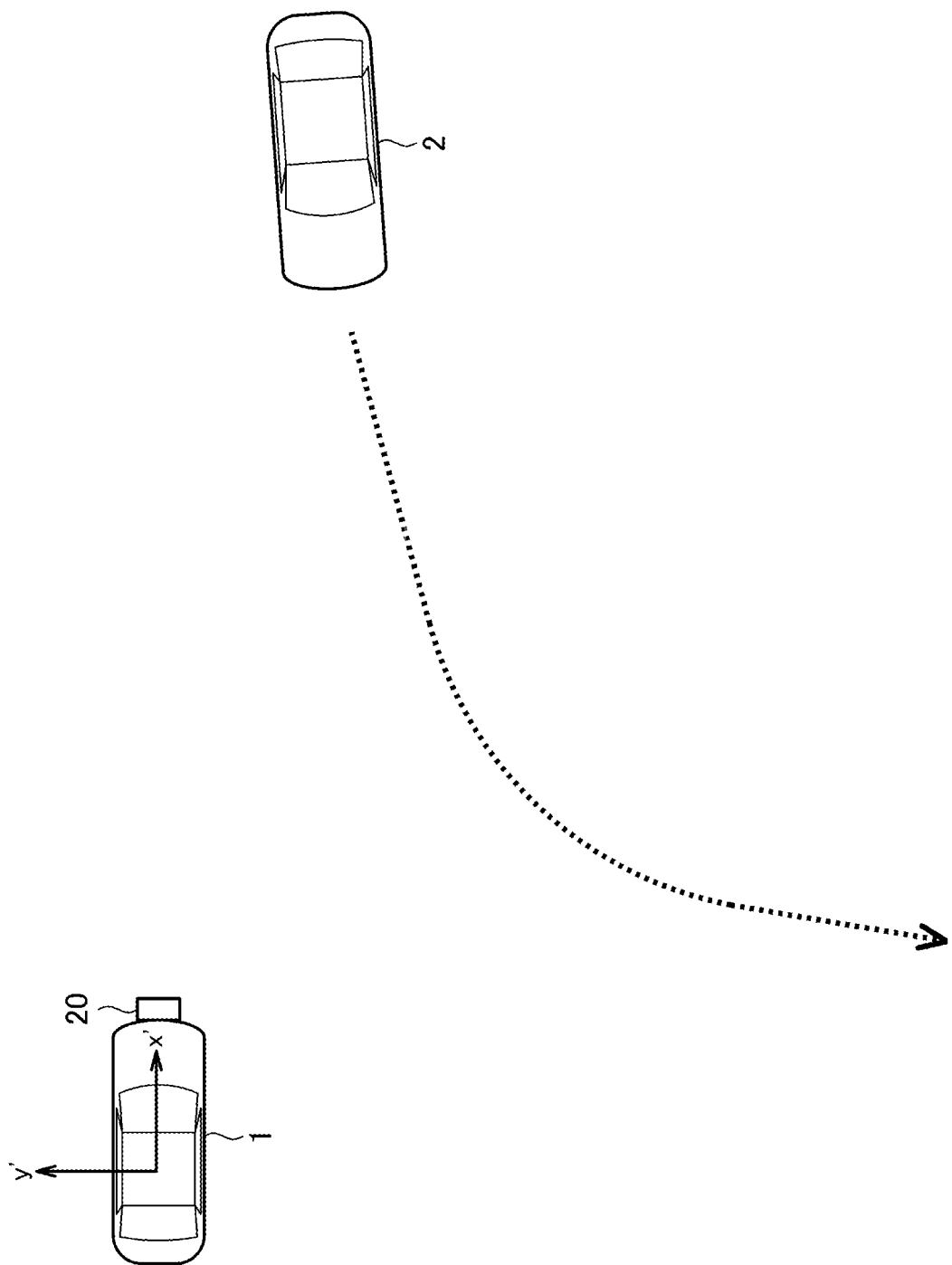
FIG. 3 is a view illustrating an aspect in which the oncoming vehicle makes a turn.
Figure 4:
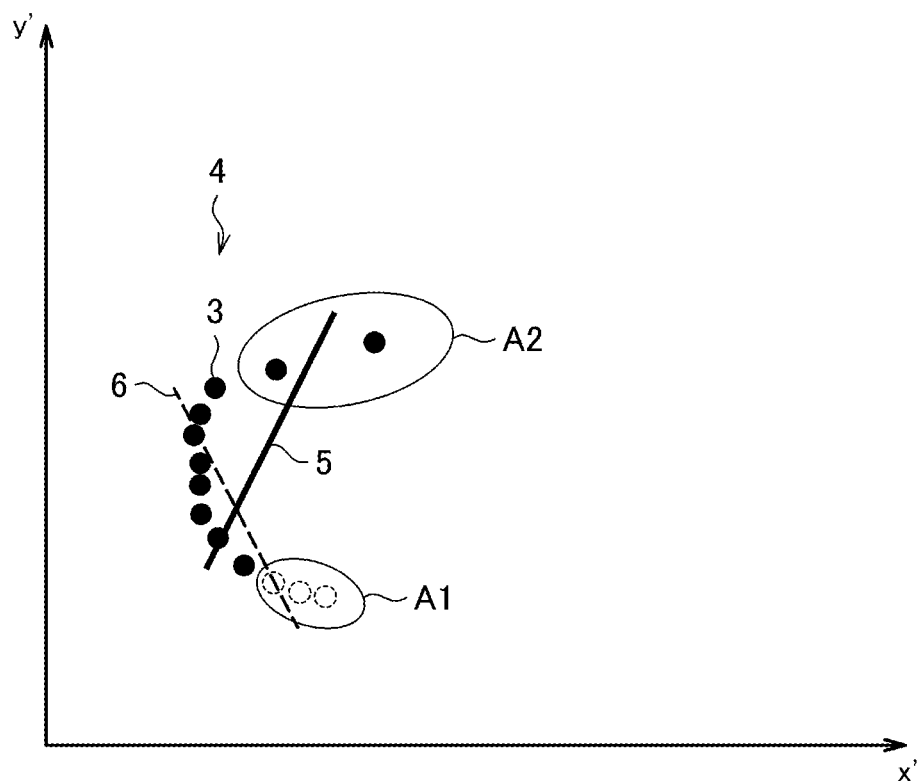
FIG. 4 is a schematic view illustrating an aspect in which an advancing direction of an oncoming vehicle is specified by a vehicle tracking device according to a comparative example under a situation in which the oncoming vehicle makes a turn.

Examples of a situation in which the data on the lateral surface of the oncoming vehicle 2 is likely to be included in the contour data 4 include a situation in which the oncoming vehicle 2 makes a turn. Hereinafter, description will be given of a case where the advancing direction of the oncoming vehicle 2 is specified by a vehicle tracking device according to a comparative example under a situation in which the oncoming vehicle 2 makes a turn with reference to FIG. 3 and FIG. 4. FIG. 3 is a view illustrating an aspect in which the oncoming vehicle 2 makes a turn. FIG. 4 is a schematic view illustrating an aspect in which the advancing direction of the oncoming vehicle 2 is specified by the vehicle tracking device according to the comparative example under a situation in which the oncoming vehicle 2 makes a turn.

As illustrated in FIG. 3, the oncoming vehicle 2 approaching the host vehicle 1 may make a turn to change an advancing direction. In FIG. 4, contour data 4 detected by the LIDAR 20 under a situation in which the oncoming vehicle 2 makes a turn is illustrated. In the contour data 4 illustrated in FIG. 4, points in a region A1 indicating one end portion (specifically, an end portion far away from the host vehicle 1) of the front surface of the oncoming vehicle 2 are not detected as the detection point data 3. On the other hand, in the contour data 4 illustrated in FIG. 4, points in a region A2 indicating a part of the lateral surface of the oncoming vehicle 2 are detected as the detection point data 3.

The vehicle tracking device according to the comparative example specifies a normal direction of an approximation line segment 5 that approximates the plurality of pieces of detection point data 3 in the contour data 4 as the advancing direction of the oncoming vehicle 2. For example, the approximation line segment 5 is a line segment corresponding to a portion partitioned by points obtained by projecting points on both ends of the plurality of pieces of detection point data 3 to an approximation straight line among a plurality of the approximation straight lines approximating the plurality of pieces of detection point data 3. However, as illustrated in FIG. 4, since data (that is, data in the region A2) on the lateral surface of the oncoming vehicle 2 is included in the contour data 4, and a part (that is, data in the region A1) of the contour data 4 is deficient, the approximation line segment 5 specified by the vehicle tracking device according to the comparative example is greatly inclined from a line segment 6 that approximates the actual front surface of the oncoming vehicle 2. Accordingly, the specified advancing direction of the oncoming vehicle 2 greatly deviates from an actual advancing direction.

In the vehicle tracking device 10 according to this embodiment, the estimation unit 121 estimates a rectangular frame that approximates an external shape of the oncoming vehicle 2. In addition, the specifying unit 123 specifies the advancing direction of the oncoming vehicle 2 on the basis of the contour data 4 of the oncoming vehicle 2 which is detected by the LIDAR 20, and the rectangular frame. According to this, the specified advancing direction is suppressed from deviating from an actual advancing direction, and thus the oncoming vehicle 2 can be appropriately tracked. Note that, details of the process relating to specifying of the advancing direction of the oncoming vehicle 2 which is performed by the vehicle tracking device 10 will be described later.

As described above, the vehicle tracking device 10 performs communication with respective devices mounted to the host vehicle 1. Communication between the vehicle tracking device 10 and the respective devices is realized, for example, by using controller area network (CAN) communication.

Note that, a function of the vehicle tracking device 10 may be partially divided by a plurality of devices, or a plurality of functions may be realized by one device. In a case where the function of the vehicle tracking device 10 is partially divided by the plurality of devices, the plurality of devices may perform communication with each other.

<Operation of Vehicle Tracking Device>

Description will be given of an operation of the vehicle tracking device 10 according to the embodiment of the invention with reference to FIG. 5 to FIG. 14.

As described above, according to the vehicle tracking device 10, the advancing direction of the oncoming vehicle 2 can be specified with accuracy, and thus it is possible to appropriately follow the oncoming vehicle 2. As an example of a process relating to specifying of the advancing direction of the oncoming vehicle 2 by the vehicle tracking device 10, a first process and a second process will be sequentially described. Note that, the vehicle tracking device 10 may execute only one of the first process and the second process, or may execute both the first process and the second process (for example, the first process and the second process may be sequentially executed).

[First Process]

First, description will be given of a flow of the first process relating to specifying of the advancing direction of the oncoming vehicle 2 with reference to FIG. 5 to FIG. 10. In the first process, the contour data 4 is adjusted on the basis of a posture of a rectangular frame 7, and the advancing direction of the oncoming vehicle 2 is specified on the basis of the contour data 4 after the adjustment.

Figure 5:
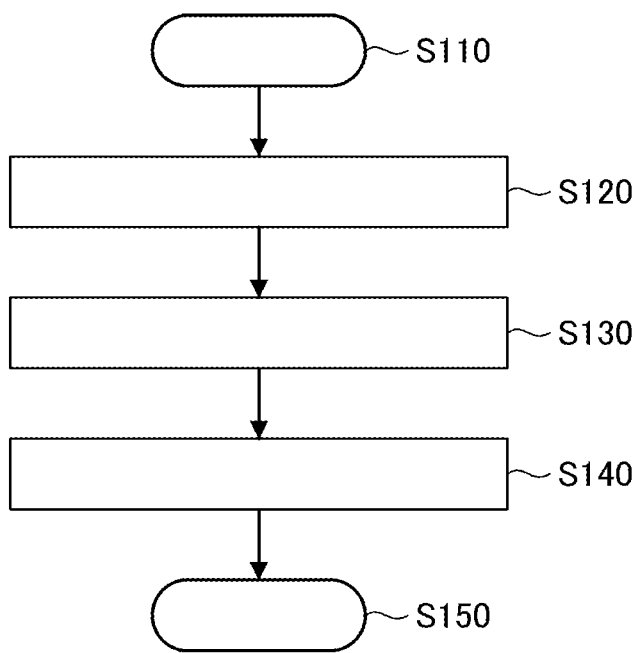
FIG. 5 is a flowchart illustrating an example of a flow of a first process relating to specifying of the advancing direction of the oncoming vehicle which is carried out by the vehicle tracking device according to the embodiment of the invention.

FIG. 5 is a flowchart illustrating an example of the flow of the first process relating to specifying of the advancing direction of the oncoming vehicle 2 which is carried out by the vehicle tracking device 10. Step S110 and step S150 in FIG. 5 correspond to initiation and termination of a control flow illustrated in FIG. 5, respectively.

When the control flow illustrated in FIG. 5 initiates, in step S120, the estimation unit 121 estimates a rectangular frame that approximates an external shape of the oncoming vehicle 2.

FIG. 6 is a schematic view illustrating an example of the rectangular frame 7 estimated by the estimation unit 121. In FIG. 6, the host vehicle 1 and the rectangular frame 7 estimated by the estimation unit 121 are illustrated. Note that, in a magnitude relationship between the host vehicle 1 and the rectangular frame 7 in FIG. 6, a change is made with respect to an actual magnitude relationship for convenience, and the magnitude relationship does not represents an actual magnitude relationship. An x-y coordinate system is a coordinate system including an x-axis that is a coordinate axis of the rectangular frame 7 in a vehicle width direction and a y-axis that is a coordinate axis of the rectangular frame 7 in a vehicle longitudinal direction. The y-axis is orthogonal to the x-axis. A positive direction of the x-axis is a direction that is spaced away from the host vehicle 1, and a negative direction of the x-axis is a direction that approaches the host vehicle 1. A positive direction of the y-axis is a direction that is spaced away from the host vehicle 1, and a negative direction of the y-axis is a direction that approaches the host vehicle 1. Hereinafter, the x-axis direction is also referred to as a vehicle width direction x of the rectangular frame 7, and the y-axis direction is also referred to as a vehicle longitudinal direction y of the rectangular frame 7.

The estimation unit 121 estimates the rectangular frame 7 on the basis of a past advancing direction specified by the specifying unit 123 by using past contour data 4. Specifically, the estimation unit 121 assumes that a central position of the oncoming vehicle 2 exists at an estimation position of the oncoming vehicle 2 at the detection time Ti which is estimated by the recognition unit 124, and estimates a rectangular frame that approximates an external shape of the oncoming vehicle 2 on an x-y plane in a case where the oncoming vehicle 2 is assumed to travel in the advancing direction Di-1 of the oncoming vehicle 2 which is specified at the previous detection time Ti-1 as the rectangular frame 7 at the detection time Ti.

The rectangular frame 7 includes two sides N1 and N2 along a vehicle width direction x, and two sides N3 and N4 along a vehicle longitudinal direction y. The side N1 is located on the host vehicle 1 side with respect to the side N2. The side N3 is located on the host vehicle 1 side with respect to the side N4. For example, a length of the rectangular frame 7 in the vehicle width direction x is set to an average value of vehicle widths of various kinds of vehicles, or the like. For example, a length of the rectangular frame 7 in the vehicle longitudinal direction y is set to an average value of vehicle lengths of various kinds of vehicles, or the like.

In FIG. 6, the contour data 4 detected by the LIDAR 20 is illustrated. As described above, the contour data 4 is composed of a plurality of pieces of detection point data 3 indicating the contour of the oncoming vehicle 2. Specifically, the contour data 4 includes a plurality of data groups 8 each including the plurality of pieces of detection point data 3 of which upper and lower positions correspond to each other (specifically, match each other) in each case. Note that, in a case where the upper and lower positions of the plurality of pieces of detection point data 3 match each other, this case includes a case where the upper and lower positions of the plurality of pieces of detection point data 3 enter a predetermined range. In addition, the upper and lower position represents position in a vertical direction. The upper and lower position of the detection point data 3 is different between the plurality of data groups 8. In the example illustrated in FIG. 6, the contour data 4 includes three data groups 8 of a data group 8a including a plurality of pieces of detection point data 3a, a data group 8b including a plurality of pieces of detection point data 3b, and a data group 8c including a plurality of pieces of detection point data 3c. In FIG. 6, and FIG. 7 to FIG. 10 to be described later, the respective data groups 8 are distinguished by hatching having a different concentration.

The upper and lower position of the detection point data 3 of the data groups 8 is higher in the order of the data group 8a, the data group 8b, and the data group 8c. That is, the data group 8a indicates the contour of the oncoming vehicle 2 at a lower position in comparison to the data group 8b and the data group 8c. The data group 8c indicates the contour of the oncoming vehicle 2 at a higher position in comparison to the data group 8a and the data group 8b. The data group 8b indicates the contour of the oncoming vehicle 2 at a position between the upper and lower position of the data group 8a and the upper and lower position of the data group 8c. That is, the data groups 8 respectively indicate contours of portions (for example, a bumper, a bonnet, and the like) different in height in the oncoming vehicle 2. Note that, FIG. 6 illustrates an example in which the number of the data groups 8 included in the contour data 4 is three, but the number of the data groups 8 included in the contour data 4 may be other than three.

Next, in step S130, the adjustment unit 122 adjusts the contour data 4.

For example, the adjustment unit 122 adjusts the contour data 4 in a state in which the coordinate system of the contour data 4 is converted from the x'-y' coordinate system that is a coordinate system of the sensor 20 into the x-y coordinate system. Hereinafter, an example in which the contour data 4 is adjusted in the x-y coordinate system will be described. However, adjustment of the contour data 4 may be carried out in the x'-y' coordinate system that is the coordinate system of the sensor 20.

The adjustment unit 122 sequentially carries out a first adjustment process, a second adjustment process, and a third adjustment process as an adjustment process of adjusting the contour data 4. Hereinafter, the first adjustment process, the second adjustment process, and the third adjustment process will be sequentially described.

Figure 7:
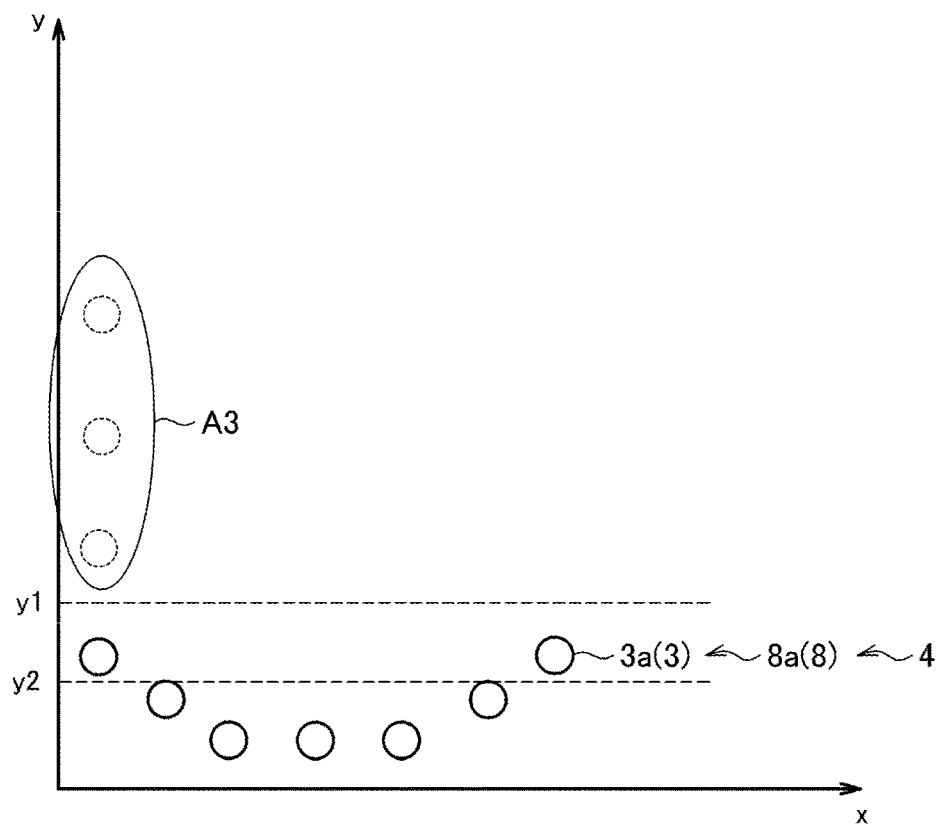
FIG. 7 is a schematic view illustrating an aspect in which contour data is adjusted by a first adjustment process that is carried out by an adjustment unit according to the embodiment of the invention.

FIG. 7 is a schematic view illustrating an aspect in which the contour data 4 is adjusted by the first adjustment process that is carried out by the adjustment unit 122.

In the first adjustment process, the adjustment unit 122 removes the detection point data 3 on a side far away from the host vehicle 1 in the vehicle longitudinal direction y of the rectangular frame 7 (that is, a positive direction side in the vehicle longitudinal direction y) among the respective data groups 8 from the contour data 4. FIG. 7 illustrates an aspect in which the first adjustment process is performed on the data group 8a among the data groups 8a, 8b, and 8c.

For example, the adjustment unit 122 removes the detection point data 3a (that is, the detection point data 3a on a positive side in the vehicle longitudinal direction y), which is farther away from the host vehicle 1 in comparison to a first reference position y1 in the vehicle longitudinal direction y of the rectangular frame 7 in the data group 8a, from the contour data 4. The first reference position y1 is a position farther away from the host vehicle 1 in comparison to an average position y2 of the detection point data 3a of the data group 8a in the vehicle longitudinal direction y of the rectangular frame 7. A difference between the average position y2 and the first reference position y1 is appropriately set to a value capable of appropriately removing data on a lateral surface of the oncoming vehicle 2 which is included in the data group 8a.

Through the first adjustment process, the detection point data 3a inside a region A3 illustrated in FIG. 7 is removed from the data group 8a. The detection point data 3a inside the region A3 which is removed in this manner is likely to be data on the lateral surface of the oncoming vehicle 2. Accordingly, the data on the lateral surface of the oncoming vehicle 2 which is included in the data group 8a can be removed. The first adjustment process is also performed on data group 8b and the data group 8c in a similar manner as in the data group 8a. The data on the lateral surface of the oncoming vehicle 2 which is included in the respective data groups 8 become the cause for deterioration in specifying accuracy for the advancing direction of the oncoming vehicle 2. Accordingly, the specifying accuracy for the advancing direction of the oncoming vehicle 2 can be appropriately improved by removing the data from the contour data 4.

Figure 8:
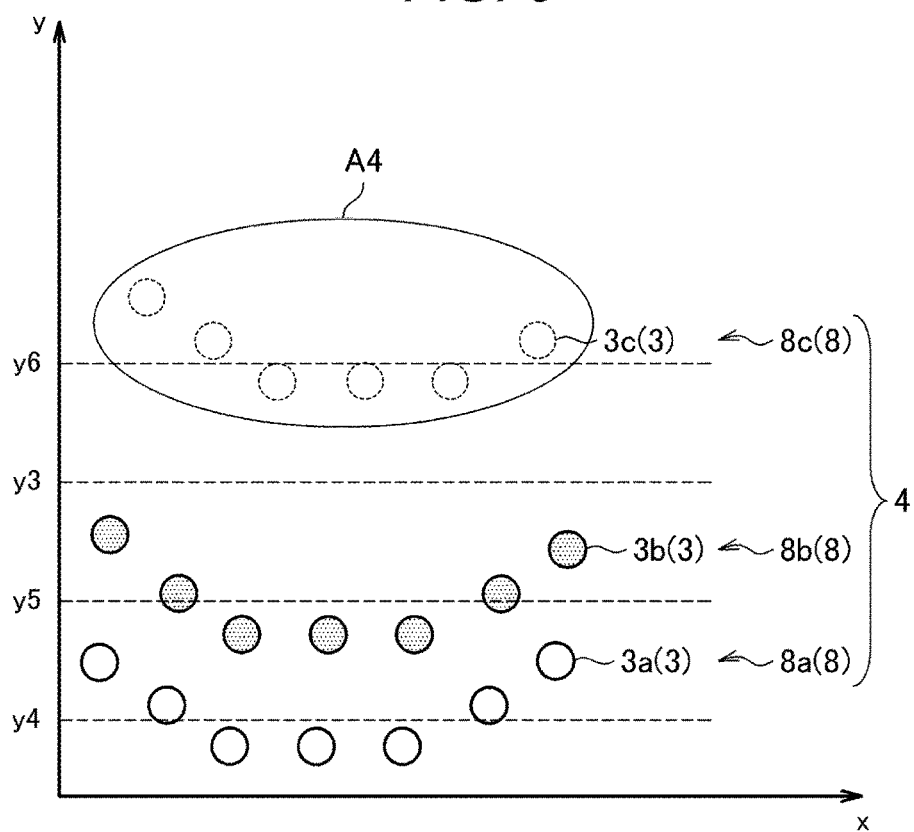
FIG. 8 is a schematic view illustrating an aspect in which the contour data is adjusted by a second adjustment process that is carried out by the adjustment unit according to the embodiment of the invention.

FIG. 8 is a schematic view illustrating an aspect in which the contour data 4 is adjusted by the second adjustment process carried out by the adjustment unit 122.

In the second adjustment process, the adjustment unit 122 removes a data group 8 on a side far away from the host vehicle 1 in the vehicle longitudinal direction y of the rectangular frame 7 (that is, a positive direction side in the vehicle longitudinal direction y) among the plurality of data groups 8a, 8b, and 8c from the contour data 4.

For example, the adjustment unit 122 removes a data group 8 in which an average position of the detection point data 3 in the vehicle longitudinal direction y of the rectangular frame 7 is farther away from the host vehicle 1 (that is, a data group 8 on a positive direction side in the vehicle longitudinal direction y) in comparison to a second reference position y3 among the plurality of data groups 8a, 8b, and 8c from the contour data 4. The second reference position y3 is a position farther away from the host vehicle 1 in comparison to an average position y4 of the detection point data 3 of the data group 8a in which an average position of the detection point data 3 in the vehicle longitudinal direction y of the rectangular frame 7 is closest to the host vehicle 1. A difference between the average position y4 and the second reference position y3 is appropriately set to a value capable of appropriately removing a data group 8 including the detection point data 3 in which a position in the upper and lower direction is excessively high. Note that, in the second adjustment process, an average position of the detection point data 3 of each of the data groups 8 in the vehicle longitudinal direction y of the rectangular frame 7 is specified by using the detection point data 3 of the data group 8 after the first adjustment process (that is, the detection point data 3 excluding the detection point data 3 removed by the first adjustment process).

For example, in the example illustrated in FIG. 8, an average position y5 of the detection point data 3 of the data group 8b in the vehicle longitudinal direction y of the rectangular frame 7 is closer to the host vehicle 1 in comparison to the second reference position y3. On the other hand, an average position y6 of the detection point data 3 of the data group 8c in the vehicle longitudinal direction y of the rectangular frame 7 is farther away from the host vehicle 1 in comparison to the second reference position y3. Accordingly, the data group 8c within a region A4 illustrated in FIG. 8 is removed from the contour data 4 by the second adjustment process.

Here, in the contour data 4, detection point data 3 in which a position in the upper and lower direction is excessively high may be likely to data on a portion (for example, a bonnet, a windshield, or the like) that does not form the external shape of the oncoming vehicle 2. Accordingly, a data group 8 (for example, the data group 8c) that includes the detection point data 3 of which a position in the upper and lower direction is excessively high can be removed from the contour data 4 by the second adjustment process. The data group 8 including the detection point data 3 of which the position in the upper and lower direction is excessively high becomes the cause for deterioration in specifying accuracy for the advancing direction of the oncoming vehicle 2. Accordingly, the specifying accuracy for the advancing direction of the oncoming vehicle 2 can be appropriately improved by removing the data from the contour data 4.

Figure 9:
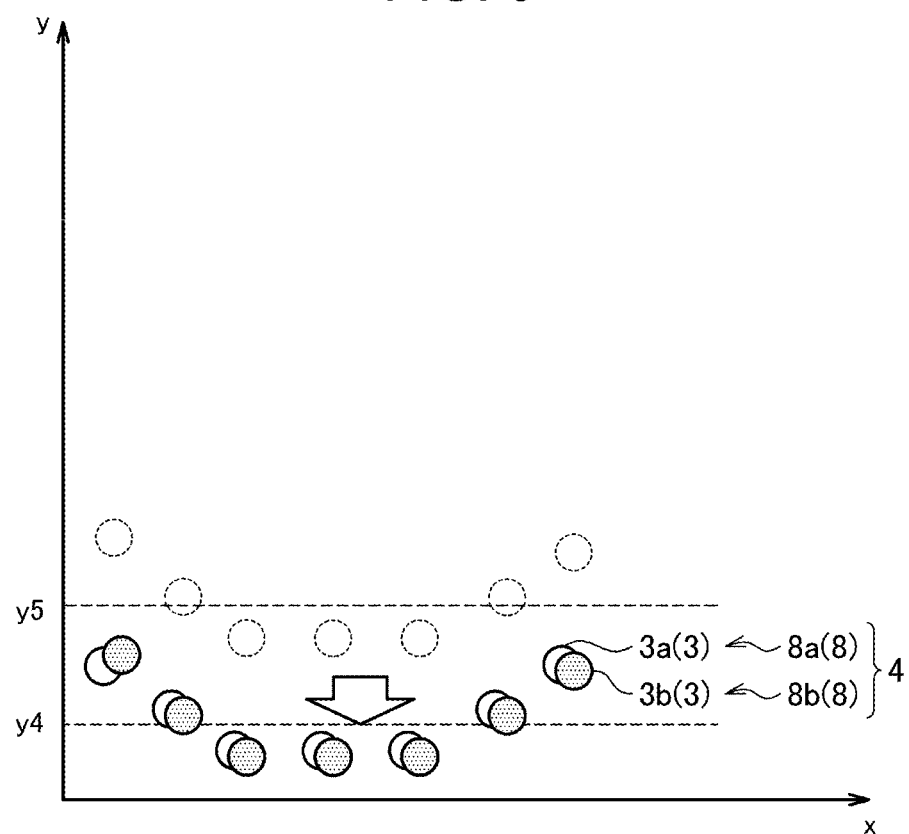
FIG. 9 is a schematic view illustrating an aspect in which the contour data is adjusted by a third adjustment process that is carried out by the adjustment unit according to the embodiment of the invention.

FIG. 9 is a schematic view illustrating an aspect in which the contour data 4 is adjusted by the third adjustment process that is carried out by the adjustment unit 122.

In the third adjustment process, the adjustment unit 122 adjusts the contour data 4 so that the plurality of data group 8 approach each other in the vehicle longitudinal direction y of the rectangular frame 7.

For example, the adjustment unit 122 adjusts the contour data 4 so that average positions of the detection point data 3 of the plurality of data groups 8a, 8b, and 8c match each other in the vehicle longitudinal direction y of the rectangular frame 7. Note that, in the third adjustment process, the average position of the detection point data 3 of the respective data groups 8 in the vehicle longitudinal direction y of the rectangular frame 7 is specified by using the detection point data 3 of the respective data groups 8 after the first adjustment process (that is, the detection point data 3 excluding the detection point data 3 removed by the first adjustment process).

For example, in a case where the data group 8c is removed from the contour data 4 by the second adjustment process, in the third adjustment process, as illustrated in FIG. 9, the adjustment unit 122 moves the data group 8b in a negative direction of the vehicle longitudinal direction y so as to approach the data group 8a. Specifically, the detection point data 3b of the data group 8b is moved in the negative direction of the vehicle longitudinal direction y so that an average position of the detection point data 3b of the data group 8b in the vehicle longitudinal direction y of the rectangular frame 7 becomes the average position y4.

As described above, a central position of the oncoming vehicle 2 which is assumed in a case where the plurality of pieces of detection point data 3 in the contour data 4 is assumed as data on the front surface of the oncoming vehicle 2 is specified as a position of the oncoming vehicle 2. Accordingly, from the viewpoint of appropriately specifying the position of the oncoming vehicle 2, it is preferable that the respective data groups 8 are moved in the negative direction of the vehicle longitudinal direction y so as to approach the data group 8a closest to the host vehicle 1.

As to be described later, specifying of the advancing direction of the oncoming vehicle 2 is carried out, specifically, on the basis of the approximation line segment 5 that linearly approximates the plurality of pieces of detection point data 3 in the contour data 4 after the third adjustment process. Accordingly, since the contour data 4 is adjusted so that the plurality of data groups 8 approach each other in the vehicle longitudinal direction y of the rectangular frame 7, the detection point data 3 in the plurality of data group 8 can be used in specifying of the advancing direction of the oncoming vehicle 2. Accordingly, even in a case where the number of pieces of the detection point data 3 (that is, the number of pieces of the detection point data 3 in the respective data groups 8) of which the upper and lower positions match each other in the contour data 4 detected by the LIDAR 20 is relatively small, specifying accuracy for the advancing direction of the oncoming vehicle 2 can be appropriately improved.

Next, in step S140, the specifying unit 123 specifies the advancing direction of the oncoming vehicle 2, and the control flow illustrated in FIG. 5 is terminated.

FIG. 10 is a schematic view illustrating an aspect in which the advancing direction Di of the oncoming vehicle 2 is specified by the specifying unit 123 at the detection time Ti.

The specifying unit 123 specifies the advancing direction Di on the basis of the contour data 4 after the adjustment by the adjustment unit 122. Specifically, the specifying unit 123 specifies a normal direction of the approximation line segment 5 that linearly approximates the plurality of pieces of detection point data 3 in the contour data 4 after the adjustment as the advancing direction Di. For example, the approximation line segment 5 is a line segment corresponding to a portion partitioned by points obtained by projecting points on both ends of the plurality of pieces of detection point data 3 to an approximation straight line among a plurality of the approximation straight lines approximating the plurality of pieces of detection point data 3 in the contour data 4 after the adjustment. For example, the specifying unit 123 specifies the approximation line segment 5 by a method of least squares. FIG. 10 illustrates the approximation line segment 5 in a case where the data group 8c is removed from the contour data 4 by the second adjustment process, and the data group 8b is moved in the vehicle longitudinal direction y by the third adjustment process so as to approach the data group 8a.

As described above, in the first process, the contour data 4 is adjusted on the basis of the posture of the rectangular frame 7, and the advancing direction of the oncoming vehicle 2 is specified on the basis of the contour data 4 after the adjustment. According to this, since the contour data 4 can be optimized as data that can be used in the advancing direction of the oncoming vehicle 2, the advancing direction of the oncoming vehicle 2 can be specified with accuracy. Accordingly, the specified advancing direction is prevented from deviating from an actual advancing direction, and thus the oncoming vehicle 2 can be appropriately tracked.

[Second Process]

Next, a flow of the second process relating to specifying of the advancing direction of the oncoming vehicle 2 will be described with reference to FIG. 11 to FIG. 14. In the second process, the advancing direction of the oncoming vehicle 2 is specified on the basis of layout of the contour data 4 with respect to a reference side (that is, a side N1) that is a side on the host vehicle 1 side among sides of the rectangular frame 7 along the vehicle width direction x of the rectangular frame 7. Hereinafter, the side N1 is also referred to as a reference side N1.

Figure 11:
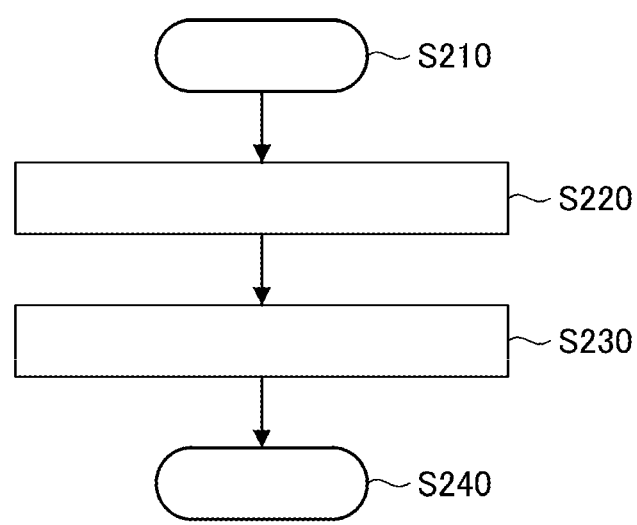
FIG. 11 is a flowchart illustrating an example of a flow of a second process relating to specifying of the advancing direction of the oncoming vehicle which is carried out by the vehicle tracking device according to the embodiment of the invention.

FIG. 11 is a flowchart illustrating an example of a flow of the second process relating to specifying of the advancing direction of the oncoming vehicle 2 which is carried out by the vehicle tracking device 10. Step S210 and step S240 in FIG. 11 correspond to initiation and termination of a control flow illustrated in FIG. 11, respectively.

When the control flow illustrated in FIG. 11 is initiated, in step S220, the estimation unit 121 estimates the rectangular frame 7 that approximates the external shape of the oncoming vehicle 2.

The estimation unit 121 estimates the rectangular frame 7 that approximates the external shape of the oncoming vehicle 2 in a similar manner as in step S120 in the first process. That is, specifically, the estimation unit 121 assumes that a central position of the oncoming vehicle 2 exists at an estimation position of the oncoming vehicle 2 at the detection time Ti which is estimated by the recognition unit 124, and estimates a rectangular frame that approximates the external shape of the oncoming vehicle 2 on the x-y plane in a case where the oncoming vehicle 2 is assumed to travel in the advancing direction Di−1 of the oncoming vehicle 2 which is specified at the previous detection time Ti−1 as the rectangular frame 7 at the detection time Ti. As described above, the specified advancing direction of the oncoming vehicle 2 may be likely to deviate from an actual advancing direction depending on a positional relationship between the host vehicle 1 and the oncoming vehicle 2. In this case, the posture of the rectangular frame 7 is likely to deviate from the posture of the oncoming vehicle 2.

Figure 12:
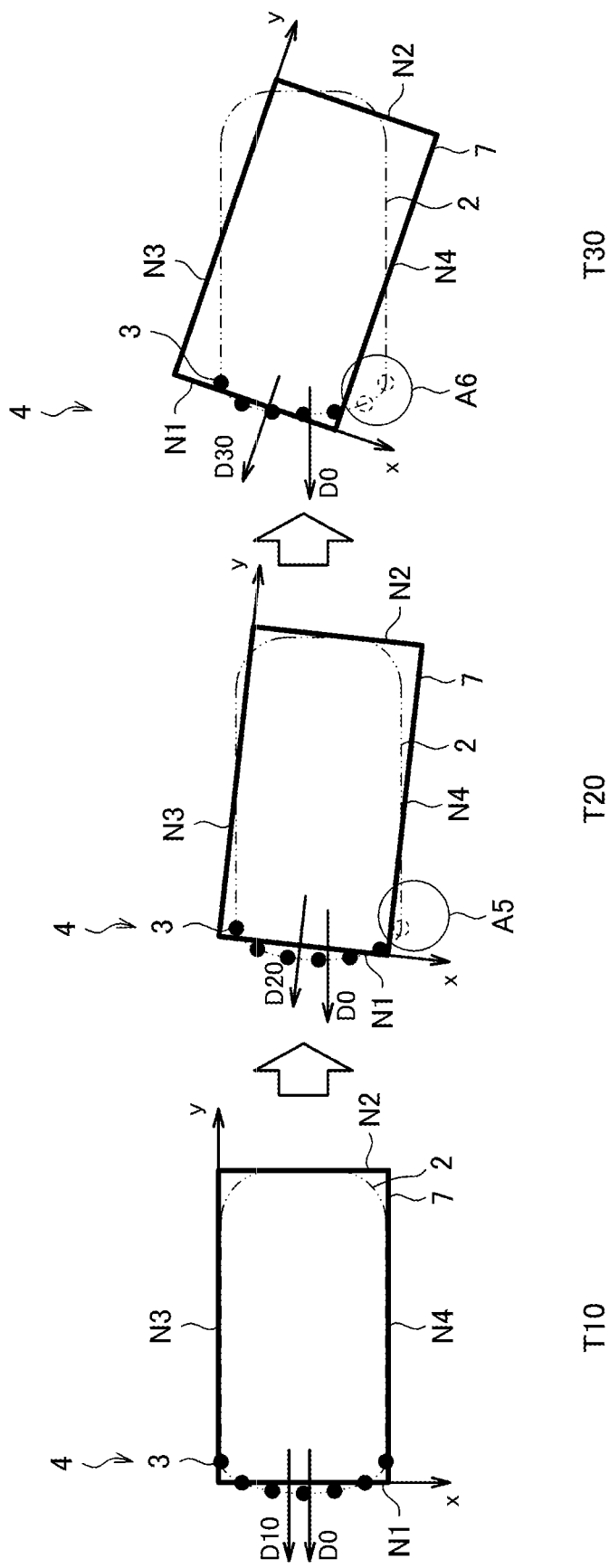
FIG. 12 is a schematic view illustrating an aspect in which a posture of a rectangular frame deviates from a posture of the oncoming vehicle according to the embodiment of the invention.

FIG. 12 is a schematic view illustrating an aspect in which the posture of the rectangular frame 7 deviates from the posture of the oncoming vehicle 2.

FIG. 12 illustrates transition of the detection point data 3 in the contour data 4 in a case where an advancing direction D0 of the oncoming vehicle 2 is maintained in a direction facing the host vehicle 1, and the oncoming vehicle 2 travels at a site that is relatively close to the host vehicle 1. Even in this case, as in a case where the oncoming vehicle 2 makes a turn as described above with reference to FIG. 3 and FIG. 4, a point at one end of the front surface of the oncoming vehicle 2 (specifically, on a side far away from the host vehicle 1) is less likely to be detected as the detection point data 3.

In the example illustrated in FIG. 12, at detection time T10, the detection point data 3 is detected over the entire region of the front surface of the oncoming vehicle 2. However, at detection time T20 after the detection time T10, a point within a region A5 at one end of the front surface of the oncoming vehicle 2 is not detected as the detection point data 3. In addition, at detection time T30 after the detection time T20, a point within a region A6, which is a region wider than the region A5, at the one end of the front surface of the oncoming vehicle 2 is not detected as the detection point data 3.

Since the advancing direction of the oncoming vehicle 2 is specified by using the approximation line segment 5 that approximates the contour data 4, in a case where the point at the one end of the front surface of the oncoming vehicle 2 (specifically, a side far away from the host vehicle 1) is less likely to be detected as the detection point data 3, the specified advancing direction of the oncoming vehicle 2 is likely to deviate from the actual advancing direction D0. In the example illustrated in FIG. 12, an advancing direction D10 that is specified at the detection time T10, an advancing direction D20 that is specified at detection time T20, and an advancing direction D30 that is specified at detection time T30 vary in this order to rotate in a clockwise direction in top surface view. In a case where the specified advancing direction of the oncoming vehicle 2 varies as described above while deviating from the actual advancing direction D0, the posture of the rectangular frame 7 deviates from the posture of the oncoming vehicle 2 due to the variation in the specified advancing direction of the oncoming vehicle 2. In the example illustrated in FIG. 12, the rectangular frame 7 varies to rotate in the clockwise direction in the order of the detection time T10, the detection time T20, and the detection time T30 in top surface view.

In the second process, even in a case where the specified advancing direction of the oncoming vehicle 2 is likely to deviate from an actual advancing direction, the advancing direction of the oncoming vehicle 2 can be specified with accuracy by the following process carried out by the specifying unit 123 with focus given to characteristics in which the posture of the rectangular frame 7 deviates from the posture of the oncoming vehicle 2 due to a variation in the specified advancing direction of the oncoming vehicle 2.

Next, in step S230, the specifying unit 123 rotationally corrects a normal direction of the approximation line segment 5 that linearly approximates the plurality of pieces of detection point data 3 in the contour data 4, and specifies a direction obtained by rotationally correcting the normal direction of the approximation line segment 5 as the advancing direction of the oncoming vehicle 2. In addition, the control flow illustrated in FIG. 11 is terminated. The rotational correction on the normal direction of the approximation line segment 5 is performed on the basis of layout of the contour data 4 with respect to the reference side N1 of the rectangular frame 7.

Figure 13:
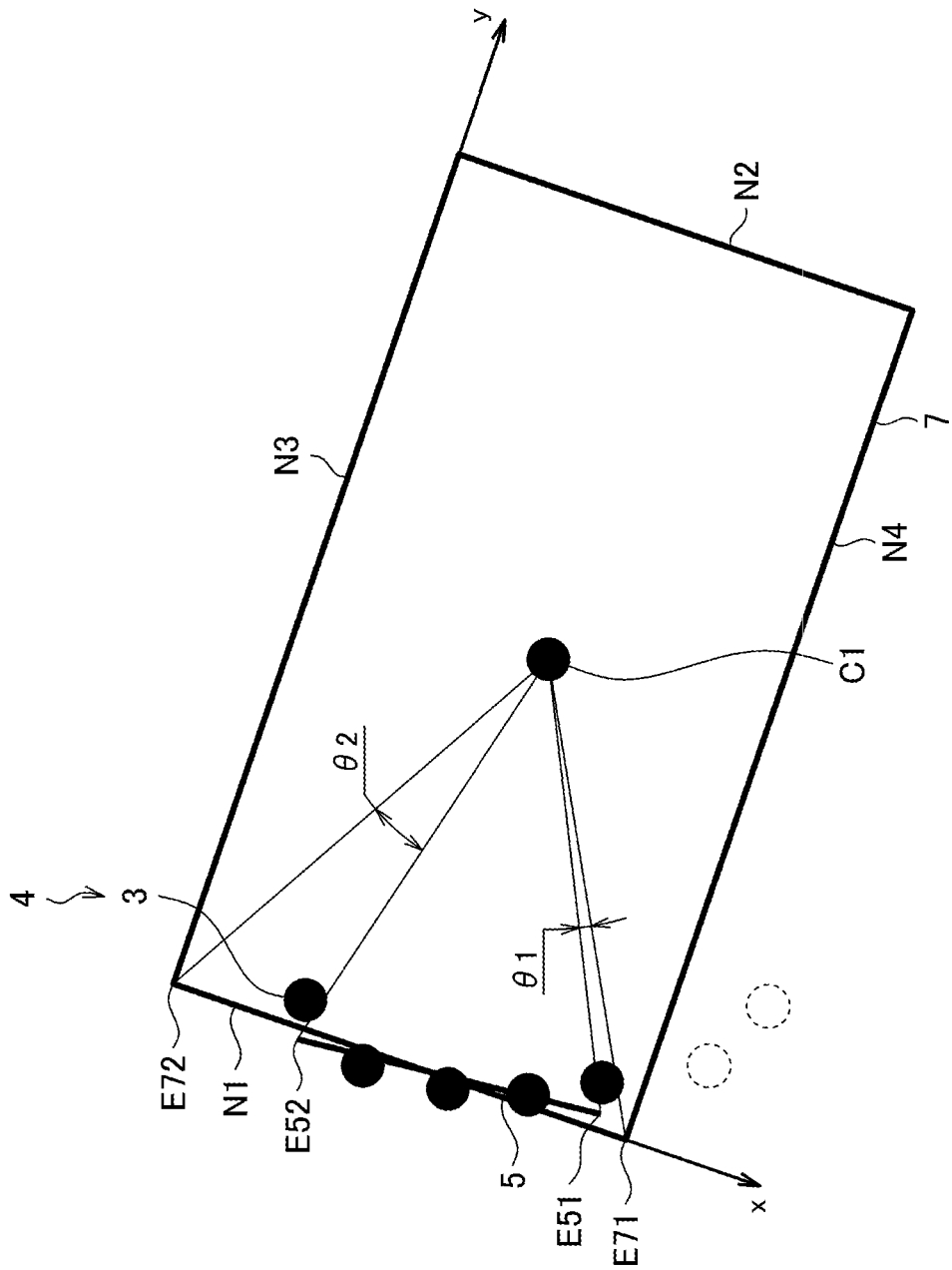
FIG. 13 is a schematic view illustrating an example of contour data layout with respect to a reference side of the rectangular frame according to the embodiment of the invention.
Figure 14:
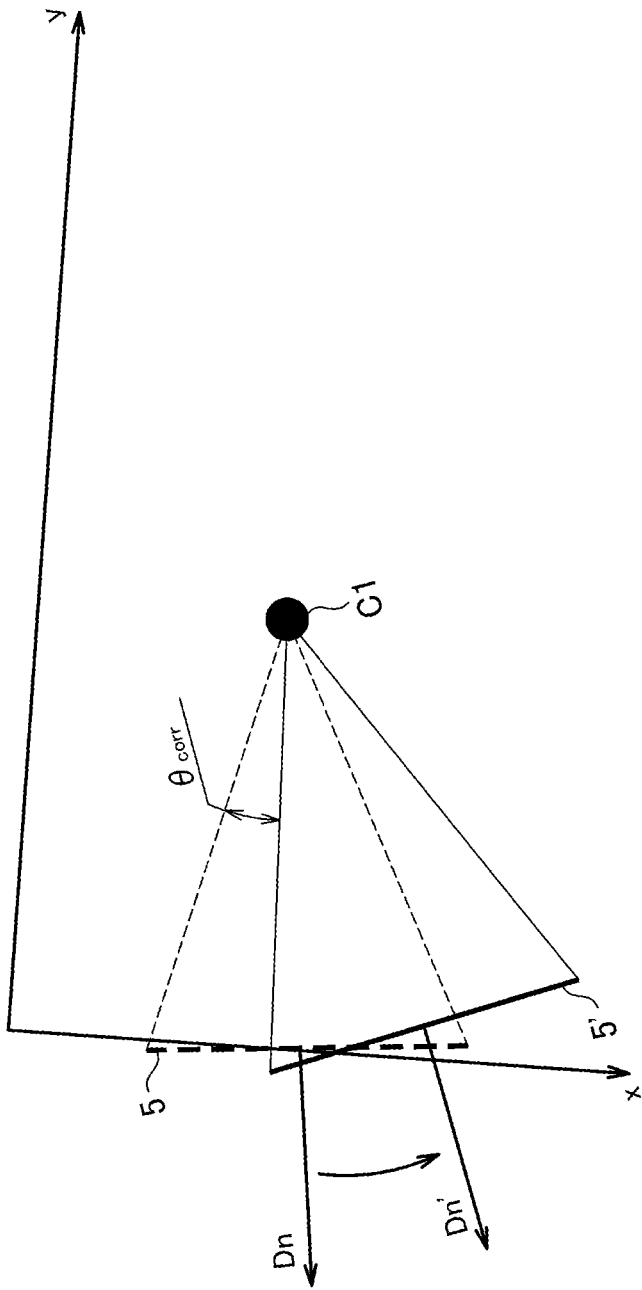
FIG. 14 is a schematic view illustrating an aspect in which a normal direction of an approximation line segment is rotationally corrected in an example illustrated in FIG. 13 according to the embodiment of the invention.

FIG. 13 is a schematic view illustrating an example of layout of the contour data 4 with respect to the reference side N1 of the rectangular frame 7. FIG. 14 is a schematic view illustrating an aspect in which the normal direction of the approximation line segment 5 is rotationally corrected in the example illustrated in FIG. 13. Note that, as described above, for example, the approximation line segment 5 is a line segment corresponding to a portion partitioned by points obtained by projecting points on both ends of the plurality of pieces of detection point data 3 to an approximation straight line among a plurality of the approximation straight lines approximating the plurality of pieces of detection point data 3 in the contour data 4.

Hereinafter, in the approximation line segment 5, an end portion on one side in the vehicle width direction x of the rectangular frame 7 (specifically, a positive direction side of the vehicle width direction x which is a side far away from the host vehicle 1) is referred to as a first line segment end portion E51, and in the approximation line segment 5, an end portion on the other side in the vehicle width direction x of the rectangular frame 7 (specifically, a negative direction side of the vehicle width direction x which is a side close to the host vehicle 1) is referred to as a second line segment end portion E52. In addition, in the reference side N1, an end portion on one side of the vehicle width direction x of the rectangular frame 7 is referred to as a first rectangular frame end portion E71, and in the reference side N1, an end portion on the other side of the vehicle width direction x of the rectangular frame 7 is referred to as a second rectangular frame end portion E72.

The specifying unit 123 rotationally corrects a normal direction of the approximation line segment 5 on the basis of a comparison result of a positional relationship between the first line segment end portion E51 of the approximation line segment 5 and the first rectangular frame end portion E71 of the reference side N1, and a positional relationship between the second line segment end portion E52 of the approximation line segment 5 and the second rectangular frame end portion E72 of the reference side N1. Specifically, the specifying unit 123 rotationally corrects the normal direction of the approximation line segment 5 on the basis of a comparison result of a degree of separation between the first line segment end portion E51 and the first rectangular frame end portion E71, and a degree of separation between the second line segment end portion E52 and the second rectangular frame end portion E72.

For example, the specifying unit 123 uses a first angle $\theta 1$ between a direction facing the first line segment end portion E51 from a center C1 of the rectangular frame 7, and a direction facing the first rectangular frame end portion E71 from the center C1 of the rectangular frame 7 as an index indicating the degree of separation between the first line segment end portion E51 and the first rectangular frame end portion E71. In addition, the specifying unit 123 uses a second angle θ2 between a direction facing the second line segment end portion E52 from the center C1 of the rectangular frame 7, and a direction facing the second rectangular frame end portion E72 from the center C1 of the rectangular frame 7 as an index indicating the degree of separation between the second line segment end portion E52 and the second rectangular frame end portion E72. For example, the specifying unit 123 rotationally corrects the normal direction of the approximation line segment 5 on the basis of a comparison result between the first angle θ1 and the second angle θ2.

In a case where the degree of separation between the second line segment end portion E52 and the second rectangular frame end portion E72 is greater than the degree of separation between the first line segment end portion E51 and the first rectangular frame end portion E71, the specifying unit 123 rotationally corrects the normal direction of the approximation line segment 5 in a direction rotating around the center C1 of the rectangular frame 7 from the second rectangular frame end portion E72 toward the first rectangular frame end portion E71 (in the example in FIG. 13, a counterclockwise direction in top surface view). On the other hand, in a case where the degree of separation between the first line segment end portion E51 and the first rectangular frame end portion E71 is greater than the degree of separation between the second line segment end portion E52 and the second rectangular frame end portion E72, the specifying unit 123 rotationally corrects the normal direction of the approximation line segment 5 in a direction (in the example in FIG. 13, in a clockwise direction in top surface view) rotating around the center C1 of the rectangular frame 7 from the first rectangular frame end portion E71 toward second rectangular frame end portion E72.

For example, the specifying unit 123 rotationally corrects the normal direction of the approximation line segment 5 in a direction rotating around the center C1 of the rectangular frame 7 from a rectangular frame end portion corresponding to a greater angle between the first angle θ1 and the second angle θ2 toward a rectangular frame end portion corresponding to a smaller angle therebetween. In the example illustrated in FIG. 13, the second angle θ2 is greater than the first angle θ1. Accordingly, as illustrated in FIG. 14, the specifying unit 123 rotationally corrects the normal direction of the approximation line segment 5 in the counterclockwise direction in top surface view. FIG. 14 illustrates a rotation angle θcorr in the rotation correction, a normal direction Dn of the approximation line segment 5 before the rotation correction, a normal direction Dn' of the approximation line segment 5 after the rotation correction, and approximation line segment 5' corresponding to the normal direction Dn' (that is, a line segment obtained by rotating the approximation line segment 5 around the center C1 by the rotation angle θcorr). On the other hand, in a case where the first angle θ1 is greater than the second angle θ2, the specifying unit 123 rotationally corrects the normal direction of the approximation line segment 5 in the clockwise direction in top surface view.

As described above with reference to FIG. 12, in a case where the degree of separation between the second line segment end portion E52 and the second rectangular frame end portion E72 is greater than the degree of separation between the first line segment end portion E51 and the first rectangular frame end portion E71, this case corresponds to a case where the advancing direction that is specified is likely to deviate from an actual advancing direction in a direction (in the example illustrated in FIG. 13, a clockwise direction in top surface view) rotating around the center C1 of the rectangular frame 7 from the first rectangular frame end portion E71 toward the second rectangular frame end portion E72. Accordingly, the normal direction of the approximation line segment 5 is rotationally corrected in a direction rotating around the center C1 of the rectangular frame 7 from the second rectangular frame end portion E72 toward the first rectangular frame end portion E71 (in the example in FIG. 13, the counterclockwise direction in top surface view) to improve specifying accuracy for the advancing direction of the oncoming vehicle 2.

On the other hand, in a case where the degree of separation between the first line segment end portion E51 and the first rectangular frame end portion E71 is greater than the degree of separation between the second line segment end portion E52 and the second rectangular frame end portion E72, this case corresponds to a case where the advancing direction that is specified is likely to deviate from the actual advancing direction in a direction rotating around the center C1 of the rectangular frame 7 from the second rectangular frame end portion E72 toward the first rectangular frame end portion E71 (in the example in FIG. 13, the counterclockwise direction in top surface view). Accordingly, the normal direction of the approximation line segment 5 is rotationally corrected in a direction (in the example illustrated in FIG. 13, a clockwise direction in top surface view) rotating around the center C1 of the rectangular frame 7 from the first rectangular frame end portion E71 toward the second rectangular frame end portion E72 to improve specifying accuracy for the advancing direction of the oncoming vehicle 2.

Here, the specifying unit 123 determines the rotation angle θcorr in the rotation correction on the normal direction of the approximation line segment 5 on the basis of the greater angle between the first angle θ1 and the second angle θ2. For example, in the example illustrated in FIG. 13, the specifying unit 123 determines the rotation angle θcorr on the basis of the second angle θ2.

Specifically, the specifying unit 123 determines an angle obtained by multiplying the greater angle between the first angle θ1 and the second angle θ2 by a gain G as the rotation angle θcorr in the rotation correction on the normal direction of the approximation line segment 5. For example, in the example illustrated in FIG. 13, the specifying unit 123 determines the rotation angle θcorr by using the following Expression (1).

$$\theta corr = G \times \theta 2 \quad (1)$$

As the gain G, various kinds of gains (PID) which are used in feedback control in which the second angle θ2 is set as a deviation between a target value and a control amount. For example, the gain G includes a proportional gain (that is, Pgain), an integration gain (that is, Igain), and differential gain (that is, Dgain).

As described above, in the second process, the advancing direction of the oncoming vehicle 2 is specified on the basis of layout of the contour data 4 with respect to the reference side N1 of the rectangular frame 7. According to this, even in a case where a specified advancing direction of the oncoming vehicle 2 is likely to deviate from an actual advancing direction, the advancing direction of the oncoming vehicle 2 can be specified with accuracy. Accordingly, since the specified advancing direction is suppressed from deviating from the actual advancing direction, the oncoming vehicle 2 can be appropriately tracked.

<Effect of Vehicle Tracking Device>

An effect of the vehicle tracking device 10 according to the embodiment of the invention will be described.

In the vehicle tracking device 10 according to this embodiment, in the first process, the estimation unit 121 estimates the rectangular frame 7 approximating an external shape of a target vehicle (for example, the oncoming vehicle 2) on the basis of past data. In addition, in the first process, the adjustment unit 122 adjusts the contour data 4 composed of the plurality of pieces of detection point data 3, which is detected by a sensor (for example, the LIDAR 20) that is mounted to the host vehicle 1 and detects a relative position of a detection target with respect to the host vehicle 1 as the detection point data 3, and indicates a contour of the target vehicle, on the basis of a posture of the rectangular frame 7. In addition, in the first process, the specifying unit 123 specifies an advancing direction of the target vehicle on the basis of the contour data 4 after adjustment. According to this, the contour data 4 can be optimized as data that is used for the advancing direction of the target vehicle, and thus the advancing direction of the target vehicle can be specified with accuracy. Accordingly, the specified advancing direction is suppressed from deviating from an actual advancing direction, and thus the target vehicle can be appropriately tracked.

In addition, in the vehicle tracking device 10 according to this embodiment, in the first process, it is preferable that the contour data 4 includes the data group 8 including a plurality of pieces of the detection point data 3 of which upper and lower positions correspond to each other, and the adjustment unit 122 removes detection point data 3 on a side far away from the host vehicle 1 in the vehicle longitudinal direction y of the rectangular frame 7 in the data group 8 from the contour data 4. According to this, data on a lateral surface of the target vehicle which is included in the data group 8 can be removed from the contour data 4. Accordingly, specifying accuracy for the advancing direction of the target vehicle can be appropriately improved.

In addition, in the vehicle tracking device 10 according to this embodiment, in the first process, it is preferable that the adjustment unit 122 removes the detection point data 3, which is farther away from the host vehicle 1 in comparison to a first reference position (for example, the first reference position y1 in FIG. 7) in the vehicle longitudinal direction y of the rectangular frame 7 in the data group 8, from the contour data 4, and the first reference position is farther away from the host vehicle 1 in comparison to an average position (for example, the average position y2 in FIG. 7) of the detection point data 3 of the data group 8 in the vehicle longitudinal direction of the rectangular frame 7. According to this, data on a lateral surface of the target vehicle which is included in the data group 8 can be more appropriately removed from the contour data 4. As a result, the specifying accuracy for the advancing direction of the target vehicle can be more appropriately improved.

In addition, in the vehicle tracking device 10 according to this embodiment, in the first process, it is preferable that the contour data 4 includes a plurality of the data groups 8 including the plurality of pieces of detection point data 3 of which the upper and lower positions correspond to each other, and the adjustment unit 122 adjusts the contour data 4 so that the plurality of data groups 8 approach each other in the vehicle longitudinal direction y of the rectangular frame 7. According to this, the detection point data 3 in the plurality of data group 8 can be used in specifying of the advancing direction of the oncoming vehicle 2. Accordingly, even in a case where the number of pieces of the detection point data 3 (that is, the number of pieces of the detection point data 3 in each of the data groups 8) of which the upper and lower positions match each other is relatively small in the detected contour data 4, the specifying accuracy for the advancing direction of the target vehicle can be appropriately improved.

In addition, in the vehicle tracking device 10 according to this embodiment, in the first process, it is preferable that the adjustment unit 122 adjusts the contour data 4 so that average positions of the detection point data 3 of the plurality of data groups 8 match each other in the vehicle longitudinal direction y of the rectangular frame 7. According to this, the detection point data 3 in the plurality of data groups 8 can be appropriately used in the specifying of the advancing direction of the oncoming vehicle 2. Accordingly, even in a case where the number of pieces of the detection point data 3 of which upper and lower positions match each other (that is, the number of pieces of detection point data 3 in the data groups 8) is relatively small in the contour data 4 that is detected, the specifying accuracy for the advancing direction of the target vehicle can be more appropriately improved.

In addition, in the vehicle tracking device 10 according to this embodiment, in the first process, it is preferable that the adjustment unit 122 removes a data group 8 on a side far away from the host vehicle 1 in the vehicle longitudinal direction y of the rectangular frame 7 in a plurality of the data groups 8 from the contour data 4. According to this, data group 8 including detection point data 3 in which a position in the upper and lower direction is excessively high can be removed from the contour data 4. Accordingly, the specifying accuracy for the advancing direction of the target vehicle can be appropriately improved.

In addition, in the vehicle tracking device 10 according to this embodiment, in the first process, it is preferable that the adjustment unit 122 removes a data group 8, in which an average position of the detection point data 3 in the vehicle longitudinal direction y of the rectangular frame 7 is farther away from the host vehicle 1 in comparison to a second reference position (for example, the second reference position y3 in FIG. 8) among a plurality of the data groups 8, from the contour data 4, and the second reference position is farther away from the host vehicle 1 in comparison to an average position (for example, the average position y4 in FIG. 8) of the detection point data 3 of the data group 8 in which the average position of the detection point data 3 in the vehicle longitudinal direction y of the rectangular frame 7 is closest to the host vehicle 1. According to this, the data group 8 including the detection point data 3 in which the position in the upper and lower direction is excessively high can be more appropriately removed from the contour data 4. As a result, the specifying accuracy for the advancing direction of the target vehicle can be improved.

In addition, in the vehicle tracking device 10 according to this embodiment, in the first process, it is preferable that the adjustment unit 122 adjusts the contour data 4 in a state in which the coordinate system of the contour data 4 is converted from the x'-y' coordinate system that is a coordinate system of the sensor (for example, the LIDAR 20) into the x-y coordinate system that is a coordinate system having a coordinate axis in the vehicle width direction x of the rectangular frame 7 and a coordinate axis in the vehicle longitudinal direction y of the rectangular frame 7. According to this, it is possible to reduce a calculation load in the adjustment process (for example, the first adjustment process, the second adjustment process, or the third adjustment process) of the contour data 4 based on the posture of the rectangular frame 7.

In addition, in the vehicle tracking device 10 according to this embodiment, in the first process, it is preferable that the specifying unit 123 specifies a normal direction of the approximation line segment 5 that linearly approximates the plurality of pieces of detection point data 3 in the contour data 4 after adjustment as the advancing direction. According to this, the advancing direction of the target vehicle can be appropriately specified by using the contour data 4 optimized as data that is used in the advancing direction of the target vehicle.

In the vehicle tracking device 10 according to this embodiment, in the second process, the estimation unit 121 estimates the rectangular frame 7 that approximates an external shape of a target vehicle (for example, the oncoming vehicle 2) on the basis of past data. In addition, in the second process, the specifying unit 123 specifies the advancing direction of the target vehicle on the basis of layout of the contour data 4 composed of a plurality of pieces of detection point data 3, which is detected by a sensor (for example, the LIDAR 20) that is mounted to the host vehicle 1 and detects a relative position of a detection target with respect to the host vehicle 1 as the detection point data 3, and indicates a contour of the target vehicle, with respect to the reference side N1 that is aside on the host vehicle 1 side among sides of the rectangular frame 7 along the vehicle width direction x of the rectangular frame 7. According to this, even in a case where the specified advancing direction of the target vehicle is likely to deviate from an actual advancing direction, the advancing direction of the target vehicle can be specified with accuracy. As a result, the specified advancing direction is suppressed form deviating from the actual advancing direction, and thus the target vehicle can be appropriately tracked.

In addition, in the vehicle tracking device 10 according to this embodiment, in the second process, it is preferable that the specifying unit 123 specifies a direction, which is obtained by rotationally correcting a normal direction of the approximation line segment 5 that linearly approximates the plurality of pieces of detection point data 3 in the contour data 4 on the basis of layout of the contour data 4 with respect to the reference side N1, as the advancing direction. According to this, specifying of the advancing direction of the target vehicle based on the layout of the contour data 4 with respect to the reference side N1 can be appropriately realized.

In addition, in the vehicle tracking device 10 according to this embodiment, in the second process, it is preferable that the specifying unit 123 rotationally corrects the normal direction of the approximation line segment 5 on the basis of a comparison result of a positional relationship between the first line segment end portion E51 that is an end portion on one side in the vehicle width direction x of the rectangular frame 7 in the approximation line segment 5 and the first rectangular frame end portion E71 that is an end portion on one side in the vehicle width direction x of the rectangular frame 7 in the reference side N1, and a positional relationship between the second line segment end portion E52 that is an end portion on the other side in the vehicle width direction x of the rectangular frame 7 in the approximation line segment 5, and the second rectangular frame end portion E72 that is an end portion on the other side in the vehicle width direction x of the rectangular frame 7 in the reference side N1. According to this, the normal direction of the approximation line segment 5 can be rotationally corrected on the basis of a comparison result of a degree of separation between the first line segment end portion E51 and the first rectangular frame end portion E71, and a degree of separation between the second line segment end portion E52 and the second rectangular frame end portion E72. Accordingly, the normal direction of the approximation line segment 5 can be rotationally corrected in correspondence with a tendency in which the specified advancing direction of the target vehicle deviates from the actual advancing direction.

In addition, in the vehicle tracking device 10 according to this embodiment, in the second process, it is preferable that the specifying unit 123 rotationally corrects the normal direction of the approximation line segment 5 on the basis of a comparison result of the first angle θ1 between a direction from the center C1 of the rectangular frame 7 toward the first line segment end portion E51 and a direction from the center C1 of the rectangular frame 7 toward the first rectangular frame end portion E71, and the second angle θ2 between a direction from the center C1 of the rectangular frame 7 toward the second line segment end portion E52 and a direction from the center C1 of the rectangular frame 7 toward the second rectangular frame end portion E72. According to this, it is possible to appropriately realize the rotational correction on the normal direction of the approximation line segment 5 on the basis of a comparison result of the degree of separation between the first line segment end portion E51 and the first rectangular frame end portion E71 and the degree of separation between the second line segment end portion E52 and the second rectangular frame end portion E72. As a result, it is possible to appropriately realize rotational correction on the normal direction of the approximation line segment 5 in correspondence with a tendency that the specified advancing direction of the target vehicle deviates from the actual advancing direction.

In addition, in the vehicle tracking device 10 according to this embodiment, in the second process, it is preferable that the specifying unit 123 rotationally corrects the normal direction of the approximation line segment 5 in a direction rotating around the center C1 of the rectangular frame 7 from a rectangular frame end portion corresponding to a greater angle between the first angle θ1 and the second angle θ2 toward a rectangular frame end portion corresponding to a smaller angle therebetween. According to this, the normal direction of the approximation line segment 5 can be appropriately rotationally corrected in a direction corresponding to a deviation direction of the specified advancing direction of the target vehicle with respect to the actual advancing direction.

In addition, in the vehicle tracking device 10 according to this embodiment, in the second process, it is preferable that the specifying unit 123 determines the rotation angle θcorr in the rotational correction on the normal direction of the approximation line segment 5 on the basis of a greater angle between the first angle θ1 and the second angle θ2. According to this, the normal direction of the approximation line segment 5 can be rotationally corrected in a correction amount corresponding to the degree of deviation of the specified advancing direction of the target vehicle with respect to the actual advancing direction.

In addition, in the vehicle tracking device 10 according to this embodiment, in the second process, it is preferable that the specifying unit 123 determines an angle obtained by multiplying the greater angle between the first angle θ1 and the second angle θ2 by a gain G as the rotation angle θcorr in the rotation correction on the normal direction of the approximation line segment 5. According to this, the correction amount in the rotational correction on the normal direction of the approximation line segment 5 can be appropriately optimized in correspondence with the degree of deviation of the specified advancing direction of the target vehicle with respect to the actual advancing direction.

In addition, in the vehicle tracking device 10 according to this embodiment, it is preferable that the estimation unit 121 estimates the rectangular frame 7 on the basis of the past advancing direction specified by the specifying unit 123 by using past contour data 4. According to this, estimation accuracy on the rectangular frame 7 that approximates the external shape of the target vehicle can be improved. Accordingly, adjustment of the contour data 4 based on the posture of the rectangular frame 7 can be optimized.

In addition, in the vehicle tracking device 10 according to this embodiment, it is preferable that the target vehicle is the oncoming vehicle 2 of the host vehicle 1. Generally, a front surface of a vehicle is more curved in comparison to a rear surface. Therefore, in a case where the target vehicle is a preceding vehicle, a direction of the rear surface that is relatively close to a flat surface is specified as the advancing direction, and in a case where the target vehicle is the oncoming vehicle 2, a direction of the front surface that is a relatively curved surface is specified as the advancing direction. Accordingly, in the related art, it is difficult to extract data on a lateral surface from the plurality of pieces of detection point data 3 in the contour data 4, particularly, in a case where the target vehicle is the oncoming vehicle 2. Accordingly, in a case where the target vehicle is the oncoming vehicle 2, it is possible to utilize the effect capable of specifying the advancing direction of the target vehicle with accuracy by the first process or the second process in a particularly effective manner.

Hereinbefore, description has been given of the preferred embodiment of the invention with reference to the accompanying drawings, but the invention is not limited to the embodiment, and it is needless to say that various modification examples or variation examples in the scope described in the appended claims pertain to the technical scope of the invention.

For example, the processes described by using the flowchart in this specification may not be executed in the order illustrated in the flowchart. Several process steps may be executed in parallel. In addition, additional process steps may be employed, or some process steps may be omitted.

In addition, for example, a series of control processes carried out by the vehicle tracking device 10 as described above may be realized by any of software, hardware, and a combination of software and hardware. For example, a program that constitutes software may be stored in advance in a storage medium that is provided inside or outside an information processing device.

What is claimed is:

1. A vehicle tracking device (10) that tracks a target vehicle (2) that travels at the periphery of a host vehicle (1), the vehicle tracking device comprising:
an estimation unit (121) that estimates a rectangular frame (7) approximating an external shape of the target vehicle (2) on the basis of past data; and
a specifying unit (123) that specifies an advancing direction of the target vehicle (2) on the basis of layout of contour data (4) composed of a plurality of pieces of detection point data (3), which is detected by a sensor (20) that is mounted to the host vehicle (1) and detects a relative position of a detection target with respect to the host vehicle (1) as the detection point data, and indicates a contour of the target vehicle (2), with respect to a reference side (N1) that is a side on the host vehicle (1) side among sides of the rectangular frame (7) along a vehicle width direction of the rectangular frame (7).

2. The vehicle tracking device according to claim 1, wherein the specifying unit (123) specifies a direction, which is obtained by rotationally correcting a normal direction of an approximation line segment (5) that linearly approximates the plurality of pieces of detection point data (3) in the contour data (4) on the basis of layout of the contour data (4) with respect to the reference side (N1), as the advancing direction.

3. The vehicle tracking device according to claim 2, wherein the specifying unit (123) rotationally corrects the normal direction on the basis of a comparison result of a positional relationship between a first line segment end portion (E51) that is an end portion on one side in a vehicle width direction of the rectangular frame (7) in the approximation line segment (5) and a first rectangular frame end portion (E71) that is an end portion on one side in the vehicle width direction of the rectangular frame (7) in the reference side (N1), and a positional relationship between a second line segment end portion (E52) that is an end portion on the other side in the vehicle width direction of the rectangular frame (7) in the approximation line segment (5), and a second rectangular frame end portion (E72) that is an end portion on the other side in the vehicle width direction of the rectangular frame (7) in the reference side (N1).

4. The vehicle tracking device according to claim 3, wherein the specifying unit (123) rotationally corrects the normal direction on the basis of a comparison result of a first angle ($\theta1$) between a direction from a center (C1) of the rectangular frame (7) toward the first line segment end portion (E51) and a direction from the center (C1) of the rectangular frame (7) toward the first rectangular frame end portion (E71), and a second angle ($\theta2$) between a direction from the center (C1) of the rectangular frame (7) toward the second line segment end portion (E52) and a direction from the center (C1) of the rectangular frame (7) toward the second rectangular frame end portion (E72).

5. The vehicle tracking device according to claim 4, wherein the specifying unit (123) rotationally corrects the normal direction in a direction rotating around the center (C1) of the rectangular frame (7) from a rectangular frame end portion corresponding to a greater angle between the first angle ($\theta1$) and the second angle ($\theta2$) toward a rectangular frame end portion corresponding to a smaller angle therebetween.

6. The vehicle tracking device according to claim 4, wherein the specifying unit (123) determines a rotation angle ($\theta corr$) in the rotational correction on the normal direction on the basis of a greater angle between the first angle ($\theta1$) and the second angle ($\theta2$).

7. The vehicle tracking device according to claim 6, wherein the specifying unit (123) determines an angle obtained by multiplying the greater angle between the first angle ($\theta1$) and the second angle ($\theta2$) by a gain as the rotation angle ($\theta corr$) in the rotation correction on the normal direction.

8. The vehicle tracking device according to claim 1, wherein the estimation unit (121) estimates the rectangular frame (7) on the basis of the past advancing direction specified by the specifying unit (123) by using the past contour data (4).

9. The vehicle tracking device according to claim 1, wherein the target vehicle (2) is an oncoming vehicle (2) of the host vehicle (1).

* * * * *